(12) United States Patent
Thakur et al.

(10) Patent No.: US 11,079,915 B2
(45) Date of Patent: Aug. 3, 2021

(54) SYSTEM AND METHOD OF USING MULTIPLE TOUCH INPUTS FOR CONTROLLER INTERACTION IN INDUSTRIAL CONTROL SYSTEMS

(71) Applicant: INTELLIGENT PLATFORMS, LLC, Charlottesville, VA (US)

(72) Inventors: Pavan Kumar Singh Thakur, Hyderabad (IN); Jagadeesh Jinka, Hyderabad (IN); Chaithanya Guttikonda, Hyderabad (IN); Vibhoosh Gupta, Schenectady, NY (US)

(73) Assignee: INTELLIGENT PLATFORMS, LLC, Charlottesville, VA (US)

( * ) Notice: Subject to any disclaimer, the term of this patent is extended or adjusted under 35 U.S.C. 154(b) by 183 days.

(21) Appl. No.: 15/145,095

(22) Filed: May 3, 2016

(65) Prior Publication Data
US 2017/0322721 A1 Nov. 9, 2017

(51) Int. Cl.
*G06F 3/0484* (2013.01)
*G05B 19/409* (2006.01)
*G06F 3/0488* (2013.01)

(52) U.S. Cl.
CPC ....... *G06F 3/04847* (2013.01); *G05B 19/409* (2013.01); *G06F 3/0488* (2013.01); *G05B 2219/36168* (2013.01); *G06F 2203/04104* (2013.01); *G06F 2203/04808* (2013.01)

(58) Field of Classification Search
CPC ....... G06F 3/04847; G06F 2203/04104; G06F 2203/04808
See application file for complete search history.

(56) References Cited

U.S. PATENT DOCUMENTS

| | | | |
|---|---|---|---|
| 4,099,247 A | 7/1978 | Mikada et al. | |
| 5,900,877 A | 5/1999 | Weiss et al. | |
| 7,062,716 B2 | 6/2006 | Washington | |
| 7,593,000 B1 | 9/2009 | Chin | |
| 8,059,101 B2 | 11/2011 | Westerman et al. | |
| 8,125,312 B2 | 2/2012 | Orr | |

(Continued)

FOREIGN PATENT DOCUMENTS

| | | |
|---|---|---|
| CN | 101251884 A | 8/2008 |
| CN | 102592524 A | 7/2012 |

(Continued)

OTHER PUBLICATIONS

Jiao, et al., "An Investigation of Two-Handled Manipulation and Related Techniques in Multi-touch Interaction", Machine Vision and Human-Machine Interface (MVHI), 2010, 565-568.

(Continued)

*Primary Examiner* — Ryan F Pitaro
(74) *Attorney, Agent, or Firm* — Marshall, Gerstein & Borun LLP

(57) ABSTRACT

Exemplified methods and systems provide a graphical HMI having an interface that mitigate or prevent touch errors and/or inadvertent touches through the use of multiple touch inputs, at a graphical user interface, of a touch-screen input device, to trigger an associated user interface command. In some embodiments, the multiple touch inputs comprise an input at two locations, one in relative association, with a displayed interface command, to trigger the command.

17 Claims, 6 Drawing Sheets

(56) References Cited

U.S. PATENT DOCUMENTS

| | | |
|---|---|---|
| 8,255,867 B1 | 8/2012 | Chaplin et al. |
| 8,286,102 B1 | 10/2012 | Wilensky |
| 8,405,616 B2 | 3/2013 | Jung et al. |
| 8,445,793 B2 | 5/2013 | Westerman et al. |
| 8,458,485 B2 | 6/2013 | Bandyopadhyay et al. |
| 8,525,799 B1 | 9/2013 | Grivna et al. |
| 8,536,978 B2 | 9/2013 | Coggill |
| 8,619,052 B2 | 12/2013 | Benko et al. |
| 8,638,939 B1 | 1/2014 | Casey et al. |
| 8,686,958 B2 | 4/2014 | Rutledge et al. |
| 8,823,642 B2 | 9/2014 | Valik et al. |
| 8,824,040 B1 | 9/2014 | Buchheit et al. |
| 8,830,072 B2 | 9/2014 | Batra et al. |
| 9,001,061 B2 | 4/2015 | Locker et al. |
| 9,030,418 B2 | 5/2015 | Ku et al. |
| 9,165,159 B1 | 10/2015 | McDonnell |
| 9,189,614 B2 | 11/2015 | DeLuca |
| 9,262,603 B2 | 2/2016 | Dow et al. |
| 9,357,391 B1 | 5/2016 | Alsvig et al. |
| 9,460,575 B2 | 10/2016 | Park et al. |
| 9,600,103 B1* | 3/2017 | Eischeid ............ G06F 3/041 |
| 9,703,392 B2 | 7/2017 | Wakabayashi et al. |
| 9,983,664 B2* | 5/2018 | Kim ..................... G06F 3/01 |
| 10,320,789 B1* | 6/2019 | Tribbensee ......... H04L 63/108 |
| 10,452,259 B1* | 10/2019 | Eischeid ............ G06F 3/041 |
| 2002/0054120 A1 | 5/2002 | Kawano et al. |
| 2002/0109677 A1 | 8/2002 | Taylor |
| 2002/0140688 A1 | 10/2002 | Steinberg et al. |
| 2002/0167500 A1 | 11/2002 | Gelbman |
| 2004/0003036 A1* | 1/2004 | Eagle .................... G06Q 10/00 |
| | | 709/203 |
| 2004/0156170 A1 | 8/2004 | Mager et al. |
| 2006/0284852 A1* | 12/2006 | Hofmeister .......... G06F 3/0483 |
| | | 345/173 |
| 2007/0024551 A1 | 2/2007 | Gelbman |
| 2007/0177803 A1 | 8/2007 | Elias et al. |
| 2007/0285385 A1 | 12/2007 | Albert et al. |
| 2008/0136587 A1 | 6/2008 | Orr |
| 2008/0303637 A1 | 12/2008 | Gelbman et al. |
| 2009/0051648 A1 | 2/2009 | Shamaie et al. |
| 2009/0089701 A1 | 4/2009 | Baier et al. |
| 2009/0122018 A1* | 5/2009 | Vymenets ........... G06F 3/04817 |
| | | 345/173 |
| 2009/0135147 A1* | 5/2009 | Hsu .................... G06F 3/04883 |
| | | 345/173 |
| 2009/0195496 A1 | 8/2009 | Koyama et al. |
| 2009/0225023 A1 | 9/2009 | Szolyga et al. |
| 2009/0262379 A1 | 10/2009 | Miyake et al. |
| 2009/0278807 A1 | 11/2009 | Hu |
| 2009/0322700 A1 | 12/2009 | D'Souza et al. |
| 2009/0327975 A1* | 12/2009 | Stedman ............... G06F 3/0416 |
| | | 715/863 |
| 2010/0020025 A1 | 1/2010 | Lemort et al. |
| 2010/0031200 A1 | 2/2010 | Chen |
| 2010/0031344 A1 | 2/2010 | Zhao et al. |
| 2010/0073303 A1* | 3/2010 | Wu ...................... G06F 3/0485 |
| | | 345/173 |
| 2010/0115473 A1 | 5/2010 | Reeves et al. |
| 2010/0138764 A1 | 6/2010 | Hatambeiki et al. |
| 2010/0162182 A1 | 6/2010 | Oh et al. |
| 2010/0177660 A1 | 7/2010 | Essinger et al. |
| 2010/0194702 A1* | 8/2010 | Chen ................... G06F 3/0488 |
| | | 345/173 |
| 2010/0245102 A1 | 9/2010 | Yokoi |
| 2010/0245341 A1 | 9/2010 | Tanaka |
| 2010/0322485 A1 | 12/2010 | Riddiford |
| 2011/0041102 A1 | 2/2011 | Kim et al. |
| 2011/0069018 A1* | 3/2011 | Atkins ................. G06F 3/0416 |
| | | 345/173 |
| 2011/0078568 A1 | 3/2011 | Park et al. |
| 2011/0156867 A1 | 6/2011 | Carrizo et al. |
| 2011/0157375 A1 | 6/2011 | Kusumoto |
| 2011/0175839 A1 | 7/2011 | Prabhu |
| 2011/0242022 A1* | 10/2011 | Wen ..................... G06F 3/0416 |
| | | 345/173 |
| 2011/0260829 A1 | 10/2011 | Lee |
| 2011/0273388 A1 | 11/2011 | Joo et al. |
| 2011/0285645 A1 | 11/2011 | Cho et al. |
| 2011/0320978 A1 | 12/2011 | Horodezky et al. |
| 2012/0023574 A1 | 1/2012 | Osborn et al. |
| 2012/0066650 A1 | 3/2012 | Tirpak et al. |
| 2012/0184368 A1* | 7/2012 | Yamaoka ............ A63F 13/2145 |
| | | 463/31 |
| 2012/0206474 A1 | 8/2012 | Holland et al. |
| 2012/0256863 A1 | 10/2012 | Zhang et al. |
| 2012/0291120 A1 | 11/2012 | Griffin |
| 2012/0306793 A1 | 12/2012 | Liu et al. |
| 2013/0033436 A1* | 2/2013 | Brinda ................. G06F 3/0488 |
| | | 345/173 |
| 2013/0057070 A1 | 3/2013 | Onishi et al. |
| 2013/0104065 A1 | 4/2013 | Stecher |
| 2013/0135178 A1* | 5/2013 | Miyahara .......... H04M 1/72522 |
| | | 345/1.3 |
| 2013/0227496 A1 | 8/2013 | Maekawa |
| 2013/0241844 A1 | 9/2013 | Chang |
| 2013/0268900 A1 | 10/2013 | Ferren et al. |
| 2013/0298071 A1 | 11/2013 | Wine |
| 2014/0026055 A1 | 1/2014 | Cohn et al. |
| 2014/0035853 A1 | 2/2014 | Ok et al. |
| 2014/0092031 A1 | 4/2014 | Schwartz et al. |
| 2014/0109018 A1 | 4/2014 | Casey et al. |
| 2014/0123080 A1 | 5/2014 | Gan |
| 2014/0143859 A1 | 5/2014 | Linge et al. |
| 2014/0149922 A1* | 5/2014 | Hauser ................. G06F 3/0488 |
| | | 715/784 |
| 2014/0173529 A1* | 6/2014 | Hicks .................. G06F 3/04883 |
| | | 715/863 |
| 2014/0189855 A1 | 7/2014 | Moradi et al. |
| 2014/0223381 A1 | 8/2014 | Huang et al. |
| 2014/0223549 A1 | 8/2014 | Quintanilla |
| 2014/0245203 A1* | 8/2014 | Lee ..................... G06F 3/04817 |
| | | 715/765 |
| 2014/0267015 A1 | 9/2014 | Saatchi et al. |
| 2014/0277753 A1* | 9/2014 | Eiynk ................... G05B 15/02 |
| | | 700/275 |
| 2014/0298237 A1 | 10/2014 | Galu, Jr. |
| 2014/0372896 A1 | 12/2014 | Raman |
| 2015/0007308 A1 | 1/2015 | Mankowski |
| 2015/0029095 A1 | 1/2015 | Gomez et al. |
| 2015/0038072 A1* | 2/2015 | Cordier ................. A47D 15/00 |
| | | 455/39 |
| 2015/0046885 A1 | 2/2015 | Zhang et al. |
| 2015/0067578 A1 | 3/2015 | Ryu et al. |
| 2015/0072784 A1 | 3/2015 | Lee |
| 2015/0121314 A1 | 4/2015 | Bombolowsky |
| 2015/0135129 A1 | 5/2015 | Kwon et al. |
| 2015/0138142 A1* | 5/2015 | Liao ..................... G06F 3/0488 |
| | | 345/174 |
| 2015/0153932 A1 | 6/2015 | Jiang et al. |
| 2015/0169141 A1 | 6/2015 | Kim et al. |
| 2015/0169216 A1 | 6/2015 | Cho |
| 2015/0169502 A1 | 6/2015 | Koenig et al. |
| 2015/0188970 A1 | 7/2015 | Kowshik et al. |
| 2015/0220182 A1* | 8/2015 | Avrahami ........... G06F 3/03543 |
| | | 345/163 |
| 2015/0227943 A1* | 8/2015 | Radomsky ........... G06Q 30/018 |
| | | 705/317 |
| 2015/0294096 A1 | 10/2015 | Grigg et al. |
| 2015/0331399 A1* | 11/2015 | Hackl ................... G06F 3/0488 |
| | | 700/83 |
| 2015/0355805 A1* | 12/2015 | Chandler ............. G06F 3/0482 |
| | | 715/784 |
| 2015/0365492 A1 | 12/2015 | Kalan et al. |
| 2016/0054851 A1* | 2/2016 | Kim ..................... G06F 3/0488 |
| | | 345/174 |
| 2017/0039691 A1 | 2/2017 | Sugioka et al. |
| 2017/0090463 A1* | 3/2017 | Wang ................. G05B 19/0426 |
| 2017/0230378 A1* | 8/2017 | Bliss ..................... H04L 63/105 |
| 2018/0004386 A1* | 1/2018 | Hinckley ............. G06F 3/0416 |
| 2018/0267690 A1* | 9/2018 | Kemp ................. G06F 3/04817 |

(56) References Cited

U.S. PATENT DOCUMENTS

| | | | |
|---|---|---|---|
| 2019/0005958 A1* | 1/2019 | Ishikawa | G06F 3/04847 |
| 2019/0095075 A1 | 3/2019 | Yang | |
| 2019/0174069 A1* | 6/2019 | Poindexter, Jr. | H04N 5/232933 |

FOREIGN PATENT DOCUMENTS

| | | |
|---|---|---|
| CN | 203204640 U | 9/2013 |
| EP | 2 042 955 A1 | 4/2009 |
| EP | 2 416 308 A1 | 2/2012 |
| WO | WO-97/21204 A1 | 6/1997 |
| WO | 2015012789 A1 | 1/2015 |

OTHER PUBLICATIONS

Lee, et al., "Access to an Automated Security System Using Gesture-Based Passwords", Network-Based Information Systems (NBiS), 2012 15 International Conference, 2012, 760-765.

Sae-Bae, et al., "Multitouch Gesture-Based Authentication", Information Forensics and Security, IEEE Transactions, 2014, 568-582.

Tsagaris, et al., "Methodology for finger gesture control of mechatronic systems", MECHATRONIKA, 2012, 1-6.

Wang, et al., "VirtualTouch: A finger glove to simulate touch screen commands", Sensors, 2012 IEEE, 2012, 1-4.

Copending U.S. Appl. No. 15/145,087, filed May 3, 2016, and the prosecution history thereof.

Copending U.S. Appl. No. 15/145,073, filed May 3, 2016, and the prosecution history thereof.

Decision on Rejection for Chinese Application No. 201480080514.0, dated Sep. 30, 2019.

European Search Report and Opinion issued in connection with related EP Application No. 16168865.0 dated Jul. 12, 2016.

European Search Report and Opinion issued in connection with related EP Application No. 16168865.0 dated Oct. 17, 2016.

Final Office Action issued in connection with related U.S. Appl. No. 14/713,467 dated Apr. 19, 2017.

First Office Action for Chinese Application No. 201480080514.0, dated Jun. 29, 2018.

International Preliminary Report on Patentability for Application No. PCT/US2014/069247, dated Jan. 10, 2017.

International Search Report and Written Opinion for Application No. PCT/US2014/069247, dated Jun. 23, 2015.

Niu, Yuan et al., "Gesture Authentication with Touch Input for Mobile Devices," Third International ICST Conference, MobiSec 2011, Aalborg, Denmark, May 17-19, 2011, pp. 13-24.

Non-Final Office Action issued in connection with related U.S. Appl. No. 14/713,467 dated Oct. 4, 2016.

Office Action, European patent application No. 14824987.3, dated Jul. 9, 2019.

Third Office Action for Chinese Application No. 201480080514.0, dated Apr. 12, 2019.

* cited by examiner

SYSTEM AND METHOD OF USING MULTIPLE TOUCH INPUTS FOR CONTROLLER INTERACTION IN INDUSTRIAL CONTROL SYSTEMS

FIELD OF THE INVENTION

Embodiments of the disclosure generally relate to controls of industrial systems, and more particularly methods and systems for interfacing with controllers.

BACKGROUND

In industrial distributed control systems, local controllers with human-machine interfaces (HMIs) may be placed near individual subsystems to which they provide associated control, management, supervision, and operation functions to the subsystem or groups thereof. Examples of such applications that include such controllers include those that interfaces with machineries and components of power plants, factories, refineries, power distribution sites, wind or solar farms, among others.

One class of local controllers is embodied as a touch screen HMI that displays data and control features graphically. Because of the harsh, crowded, and tumultuous physical conditions associated with industrial environments, ruggedized HMIs are often used. These ruggedized HMIs often have impact-resistant designs with limited display areas that result in densely arranged graphics, data displays, and controls that are selectable and controllable by an operator. And, because of the dense arrangements of the display and control and the physical conditions associated with the industrial environments, controls may be mistakenly or inadvertently touched by the operator causing inconvenience and loss and improper conditions of the controller in many circumstances.

What are needed are devices, systems and methods that overcome challenges in the present art, some of which are described above.

SUMMARY

Exemplified methods and systems provide a ruggedized graphical HMI having an interface that mitigate or prevent touch errors and/or inadvertent touches through the use of multiple touch inputs, at a graphical user interface, of a touch-screen input device, to trigger an associated user interface command. In some embodiments, the multiple touch inputs comprise an input at two locations, one in relative association, with a displayed interface command, to trigger the command. The multiple touch inputs may be invoke via two fingers placed at the HMI by the operator, e.g., a finger to be landed on the touch screen and another finger to be tapped on the user control on the touch screen to trigger an operation associated with the user control. This may be referred to as a "Land and Tap" input. The command-invocation multiple touch inputs beneficially provide a mechanism of mistake proofing against unintended triggering of a command or an operation due to unintentional finger tap on user control like buttons.

In some embodiments, the HMI presents a "Set Point" button for triggering the setting of a parameter value on a field device. This Set-Point button is associated with a critical operation of an industrial machinery or subsystem in an industrial control application. If the HMI display is cluttered, or densely arranged, with several user controls on one HMI screen, which often occurs due to the number of controllable inputs associated with such industrial machineries and subsystems, there is always a risk that the operator may mistakenly or inadvertently touch the 'set point' button. The exemplified "Land and Tap" input may be invoke via both the thumb of the operator being placed on the screen near the Set-Point button and without touching Set-Point button, and the index finger being simultaneously placed on the Set Point button. To this end, a single input received at the Set-Point button does not invoke or trigger the attached operation associated with the button.

According to an aspect, a method is disclosed of receiving multiple touch inputs, at a graphical user interface, of a touch-screen input device, in an industrial automation system, to trigger an associated user interface command (e.g., a graphical user interface command). The method includes presenting, by a processor, via a touch-screen display, a graphical element (e.g., an application icon or a control set-point) associated with execution of an application or a control commands. And, either, i) upon receipt, via the touch-screen display, of a first input at a first position corresponding to the graphical element, determining, by the processor, receipt of a second associated touch input at a second position associated with the activation of the graphical element, or ii) upon receipt, via the touch-screen display, of the second associated touch input at the second position associated with the activation of the graphical element, and determining receipt of the first input at the first position associated with the graphical element; in response to the first input and second associated touch input not being concurrently received, maintaining, by the processor, the graphical element associated with execution of the application or the control commands in a non-activated state; and in response to the first input and second associated touch input being concurrently received, causing, by the processor, activation of the graphical element associated with execution of the application or the control commands.

In some embodiments, the method includes presenting, by the processor, via the touch-screen display, a second graphical element for receipt of the second associated touch input.

In some embodiments, the second associated touch input comprises a point-based input received at one or more pre-defined virtual region (e.g., lower right or lower left of the icons—for each of right hand and left hand operators) located proximal to the graphical element associated with execution of the application or control command.

In some embodiments, the method includes presenting, by the processor, via the touch-screen display, a graphical element associated with selection of a location for the pre-defined virtual region (e.g., to select left hand control or right hand control).

In some embodiments, the second associated touch input comprises a point-based input received for a minimum time parameter.

In some embodiments, the second associated touch input comprises a point-based input received between a minimum time parameter and a maximum time parameter, wherein receipt of inputs outside the minimum and maximum time parameters are ignored as a non-activated input.

In some embodiments, the method includes presenting, by the processor, via the touch-screen display, a second graphical element for receipt of the second associated touch input at one of a lower or upper corner (e.g., lower left hand or lower right hand corner) of the touch-screen display (e.g., to require two hands—one to touch the unlock button and one to activate a command).

In some embodiments, the graphical element are displayed in a dense matrix of graphical elements.

In some embodiments, the method includes presenting, by the processor, via the touch-screen display, an indicia (e.g., screen change color) of the second associated touch input being received.

In some embodiments, the method includes, in response to a third touch input concurrently received with the first input and the second input, maintaining, by the processor, the graphical element associated with execution of the application or control command in the non-activated state.

According to another aspect, a system is disclosed (e.g., for in an industrial automation system) to trigger an associated user interface command using multiple concurrently-received touch inputs, at a graphical user interface, of a touch-screen input device. The system includes a touch-screen display; a processor operatively coupled to the touch-screen display; and a memory operatively coupled to the processor, the memory having instructions stored thereon, wherein execution of the instructions, cause the processor to: present, via the touch-screen display, a graphical element (e.g., an application icon or a control setpoint) associated with execution of an application or a control commands; either i) upon receipt, via the touch-screen display, of a first input at a first position associated with the graphical element, determine a second associated touch input at a second position associated with the activation of the graphical element, or ii) upon receipt, via the touch-screen display, of the second associated touch input at the second position associated with the activation of the graphical element, determine the first input at the first position associated with the graphical element; in response to the first and second touch input not being concurrently received with the input, maintain the graphical element associated with execution of an application or a control commands in a non-activated state; and in response to the first and second touch input being concurrently received with the input, cause activation of the graphical element associated with execution of an application or a control command.

In some embodiments, the instructions, when executed by the processor, further cause the processor to: present via the touch-screen display, a second graphical element for receipt of the second associated touch input.

In some embodiments, the second associated touch input comprises a point-based input received at one or more pre-defined virtual region (e.g., lower right or lower left of the icons—for each of right hand and left hand operators) located proximal to the graphical element associated with execution of the application or control command.

In some embodiments, the instructions, when executed by the processor, further cause the processor to: present, via the touch-screen display, a graphical element associated with selection of a location for the pre-defined virtual region (e.g., to select left hand control or right hand control).

In some embodiments, the second associated touch input comprises a point-based input received for a minimum time parameter.

In some embodiments, the second associated touch input comprises a point-based input received between a minimum time parameter and a maximum time parameter, wherein receipt of inputs outside the minimum and maximum time parameters are ignored as non-activated input.

In some embodiments, the instructions, when executed by the processor, further cause the processor to: present, via the touch-screen display, a second graphical element for receipt of the second associated touch input at one of a lower or upper corner of the touch-screen display.

In some embodiments, the graphical element are displayed in a dense matrix of graphical elements.

In some embodiments, the instructions, when executed by the processor, further cause the processor to: in response to a third touch input concurrently received with the first input and the second input, maintain the graphical element associated with execution of the application or control command in the non-activated state.

According to another aspect, a non-transitory computer readable medium to trigger an associated user interface command using multiple concurrently-received touch inputs, at a graphical user interface, of a touch-screen input device, is disclosed. The computer readable medium has instructions stored thereon, wherein execution of the instructions, cause the processor to: present, via a touch-screen display associated with a computing device, a graphical element (e.g., an application icon or a control set-point) associated with execution of an application or a control commands; either i) upon receipt, via the touch-screen display, of a first input at a first position corresponding to the graphical element, determine a second associated touch input at a second position associated with the activation of the graphical element; or ii) upon receipt, via the touch-screen display, of the second associated touch input at the second position associated with the activation of the graphical element, determine the first input at the first position associated with the graphical element; in response to the first and second touch input not being concurrently received with the input, maintain the graphical element associated with execution of an application or a control commands in a non-activated state; and in response to the first and second touch input being concurrently received with the input, cause activation of the graphical element associated with execution of an application or a control commands.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
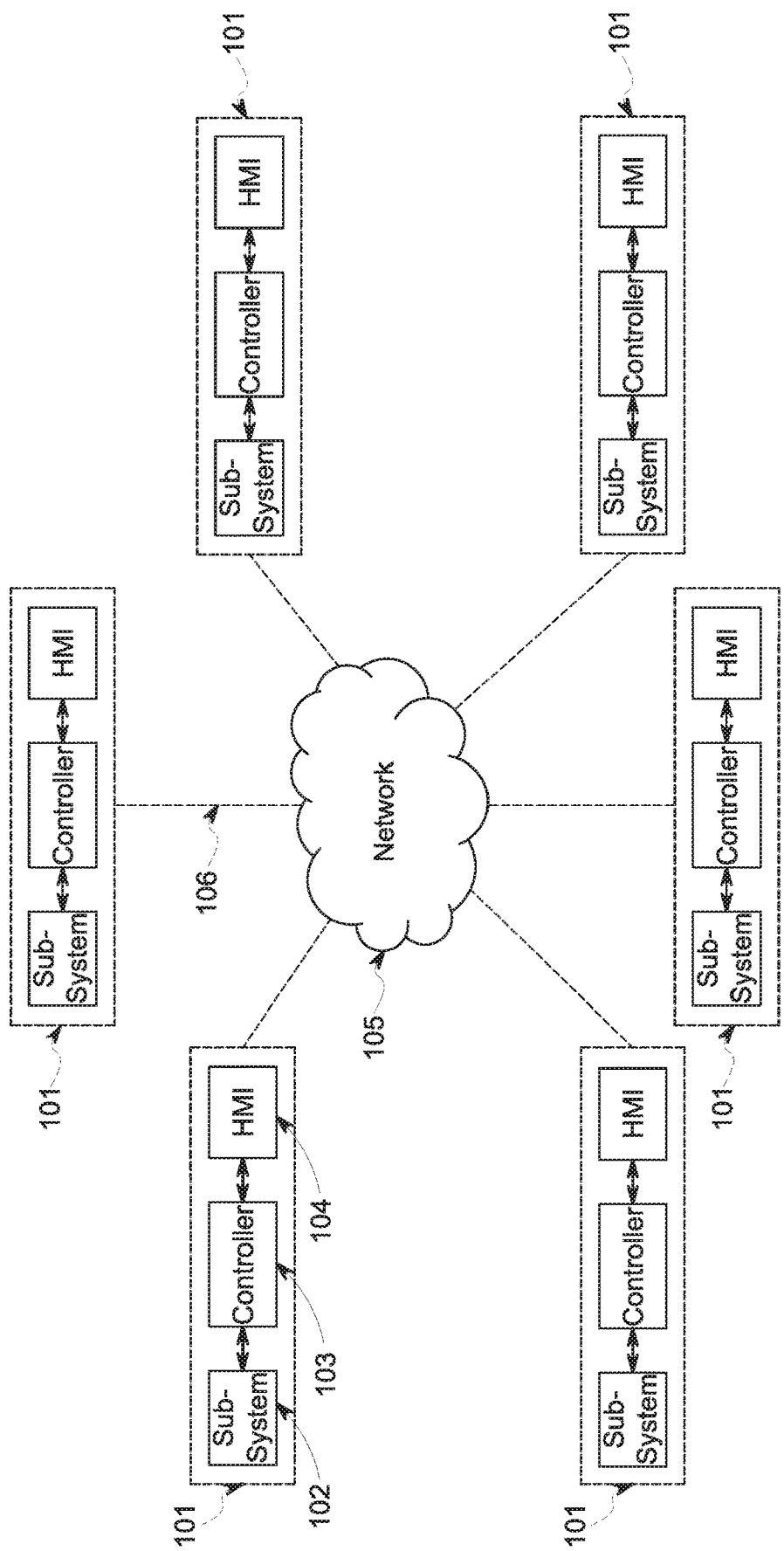
FIG. 1 schematically depicts an industrial automation system with distributed control via a plurality of human-machine interfaces (HMIs) that are each located proximate to individual subsystems according to an illustrative embodiment.

Unless defined otherwise, all technical and scientific terms used herein have the same meaning as commonly understood by one of ordinary skill in the art. Methods and materials similar or equivalent to those described herein can be used in the practice or testing of the present disclosure.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It is understood that throughout this specification the identifiers "first", "second", "third", and such, are used solely to aid in distinguishing the various components and steps of the disclosed subject matter. The identifiers "first", "second", "third", and such, are not intended to imply any particular order, sequence, amount, preference, or importance to the components or steps modified by these terms.

The present methods and systems may be understood more readily by reference to the following detailed description of preferred embodiments and the Examples included therein and to the Figures and their previous and following description.

FIG. 1 schematically depicts an industrial automation system with distributed control via a plurality of human-machine interfaces (HMIs) that are each located proximate to individual subsystems according to an embodiment of the present invention. As shown in FIG. 1, industrial systems (e.g., power generation/distribution, oil refinement, water treatment, chemical processing, etc.) may have a plurality of subsystems. Each subsystem in the plurality may be different, each performing a particular aspect of an overall process. Alternatively a system may use a plurality of duplicate subsystems, each performing a duplicate process. These subsystems may be collocated or separated. Separated subsystems may be located at the same facility or may be located in different facilities that are separated by large distances. Rather than controlling/monitoring the subsystems in a central location, the control/monitoring of the various subsystems is often distributed (e.g., geographically, functionally, etc.), wherein a plurality of controllers, each controlling/monitoring a subsystem are utilized. The distributed controllers may be interconnected and communicate (e.g., connected in a hierarchy) in order function and perform.

Referring still to FIG. 1, a local network 101 (e.g., remote stations) may be communicatively coupled (wired or wirelessly) 106 to a network 105 and thus may send and receive information to/from other local networks. Each local network 101 may include at least a subsystem 102, a controller 103, and a human machine interface 104, though many other possible configurations can be envisioned (e.g., one subsystem having many controllers and a many HMIs). The subsystem, controller(s), and HMI may be interconnected and may communicate using standard communication protocols. The subsystem 102 typically includes the mechanical (e.g., valves, pumps, pneumatic devices, etc.) and/or electrical components (e.g., sensors, actuators, switches, breakers, etc.) necessary to perform all or part of an industrial process. These components are controlled and/or monitored by at least one controller (i.e., field device) 103. Various types of controllers may be used (e.g., programmable logic controller (PLC), programmable automation controller (PAC), and supervisory control and data acquisition (SCADA) systems). The controller 103 may generate the signals necessary to control the subsystem 102 and may receive signals from the subsystem for monitoring or control (e.g., feedback signals). A controller 103 may include processors, digital/analog I/O ports, timers, and/or memory and may also be programmed to execute logic sequences and/or respond to remote/local directives from a user and/or from another subsystem/component/controller.

Figure 2:
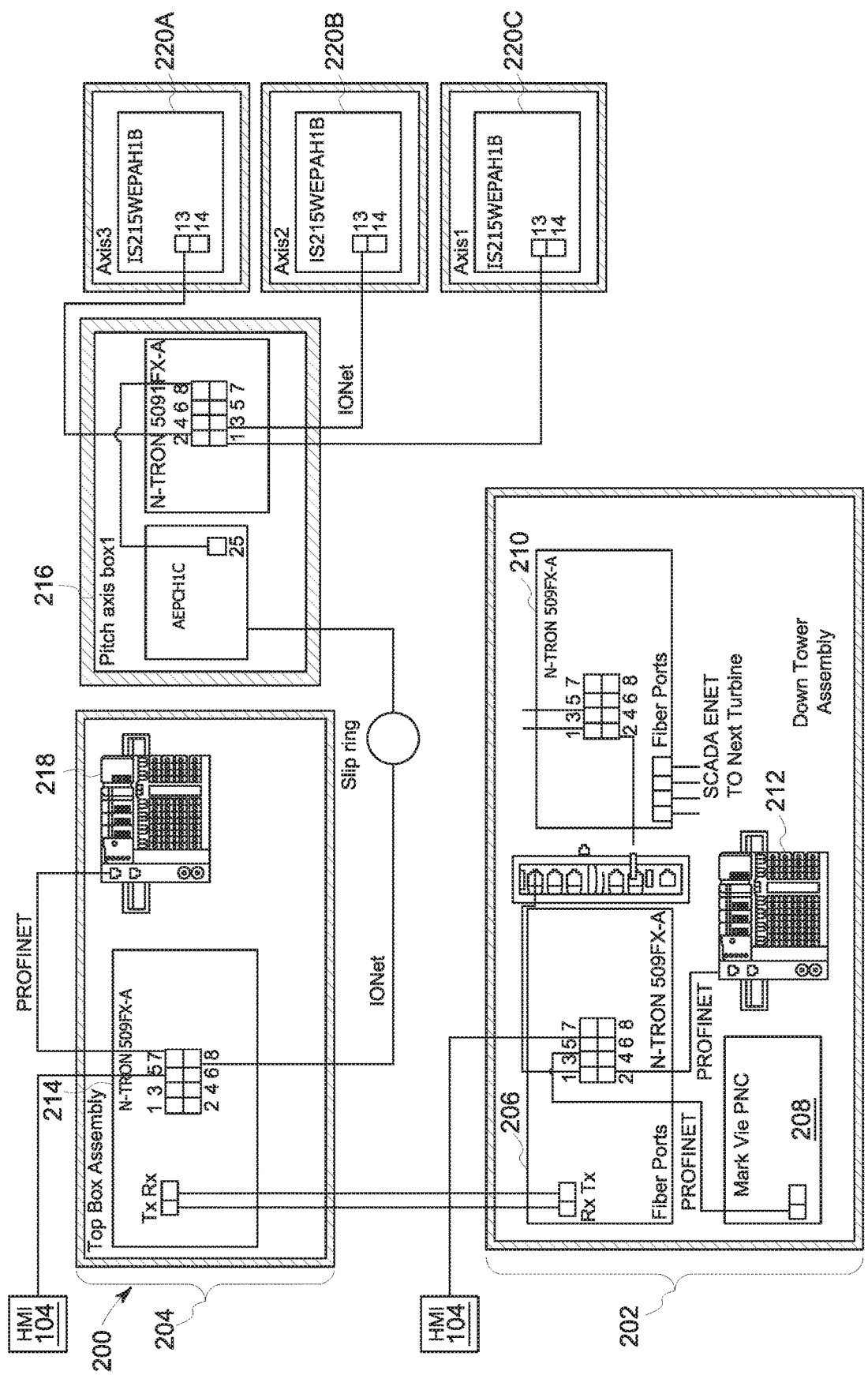
FIG. 2 schematically depicts an example implementation of a distributed control system (DCS), in accordance with the illustrative embodiment.

FIG. 2 schematically depicts an example implementation of a distributed control system (DCS) 200, in accordance with the illustrative embodiment. As shown in FIG. 2, a distributed control system 200 for a wind turbine generator may include a first local network 202 located at the base of the wind turbine connected to a second local network 204 located at the turbine cab. The first local network 202 includes a network device 206 having a communication link (e.g., via Profinet, Profibus, InterCAD) and communicates with a controller 208 (shown as "Mark Vie 2308"), a SCADA system 210 to connect to other wind turbine generators, and a controller 212 to monitoring conditions at the base of the tower. The second local network 204 includes a second network device 214 having a communication link (e.g., via Profinet, Profibus, InterCAD) and communicates with controllers 216 for each pitch axis (e.g., that regulates control of the pitch, yaw, and rotation of one of the multiple blades of the turbine), and controller 218 for monitor conditions at the nacelle of the tower. The controllers 216 connect to controllers 220a, 220b, 220c for each of the blade rotatable axis. An HMI may be located proximate to the first local network 202 and the second local network 204. Because of the closed-environment in the inside of the turbine nacelle or at the base of the turbine, an operator therein may make inadvertent or incorrect activation of control widgets for the controller and presented on the HMI.

Figure 3:
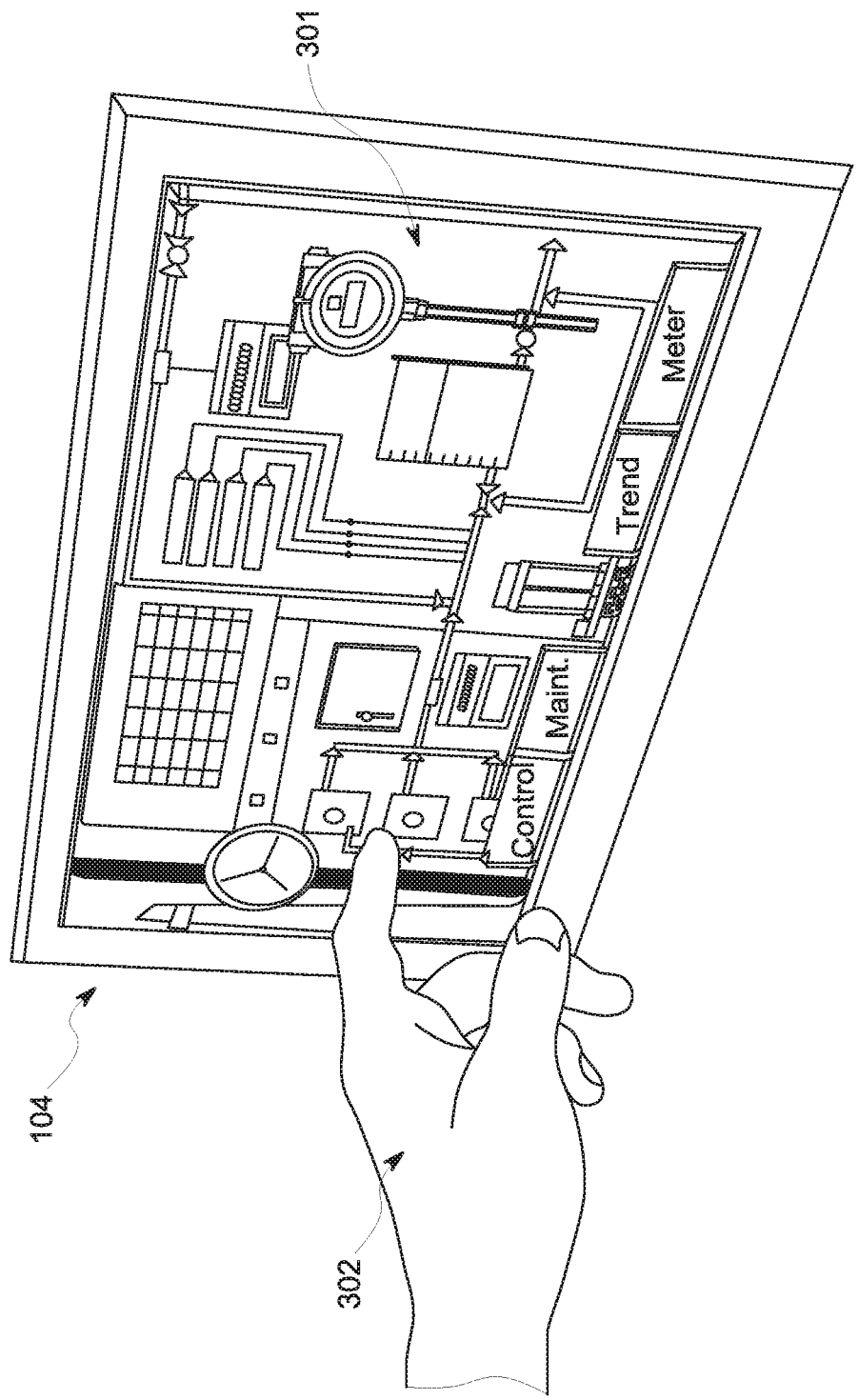
FIG. 3 graphically depicts an example human-machine interface (HMI) and a user interacting therewith, in accordance with the illustrative embodiment.

FIG. 3 graphically depicts an example human-machine interface (HMI) and a user interacting therewith, in accordance with the illustrative embodiment. The HMI 104 includes a touch screen 301 (e.g., resistive, capacitive) that displays information and accepts touch inputs from a user 302. The touch inputs trigger various operations (e.g., change a virtual control, start an application, trigger a function or communication, interact with data, etc.). Traditionally, a user 302 interacts with the controls presented on the screen by simply touching a "touch area" designated on the screen.

As illustrated in FIG. 3, the amount of information presented on an HMI touch screen 301 may be dense. The HMI may display a plurality of data from the subsystem (e.g., system status, operating values, etc.). Further, it may be necessary to display the data in a variety of formats (e.g., graphs, charts, animation showing operation, etc.) and to perform some analysis on the data for a worker to control the subsystem properly. In addition, the controls may be displayed in a way that orients the operator by graphically illustrating the subsystem. As shown in FIG. 3, the HMI may present inputs (e.g., switches, slides, buttons, dials, etc.) to control various elements or various aspects of the subsystem.

Because of the dense presentation of widgets on a HMI for an industrial controller, mistakes may occur by an operator when the wrong area of the HMI is touched. In addition, the HMI may be located in space confined areas that increase the risk of inadvertent touching of the graphical input of the HMI.

To mitigate, errors in input or unintentional touches, the exemplified system and method uses multiple touch inputs that may be specified in a given sequence and for a given duration to activate an operation associated with a widget presented on a control screen of the HMI.

Figure 4:
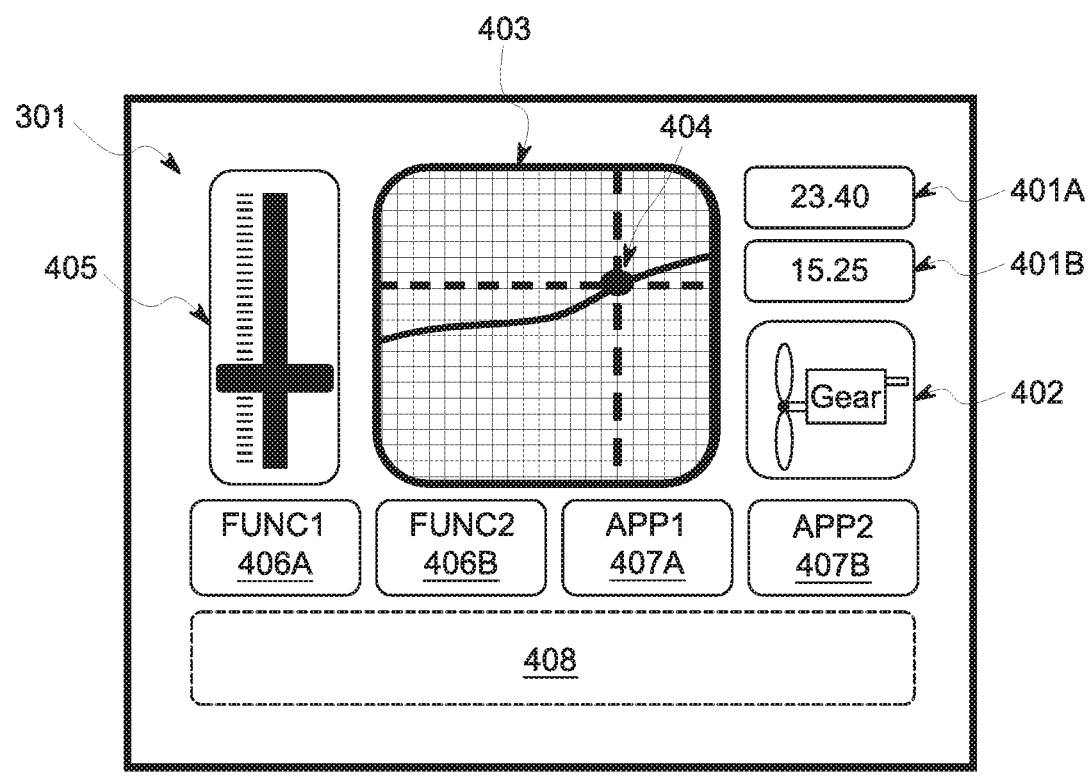
FIG. 4 graphically depicts an HMI configured for two figure touch operation, in accordance with the illustrative embodiment.

FIG. 4 illustrates an example HMI touch screen 301 in an industrial automation system. As shown in FIG. 4, the control screen includes a graphical widget associated with a 'Set Point' control 405. The widget, when activated, via the HMI screen, is configured to trigger the setting of a parameter value on the touch screen of the subsystem's (e.g., the field device's) HMI. The set point control may be critical to operation of the subsystem and should only be touched when necessary. If the HMI touch screen (i.e., screen) 301 is cluttered with many user controls, is located in a crowded environment, or is in an awkward position for a user, there is a risk that the user could finger tap on the 'set point' virtual control 405 by mistake or inadvertently. This mistake may cause damage, loss, create a safety/regulatory violation, or cause harm to a user or the environment.

Figure 5:
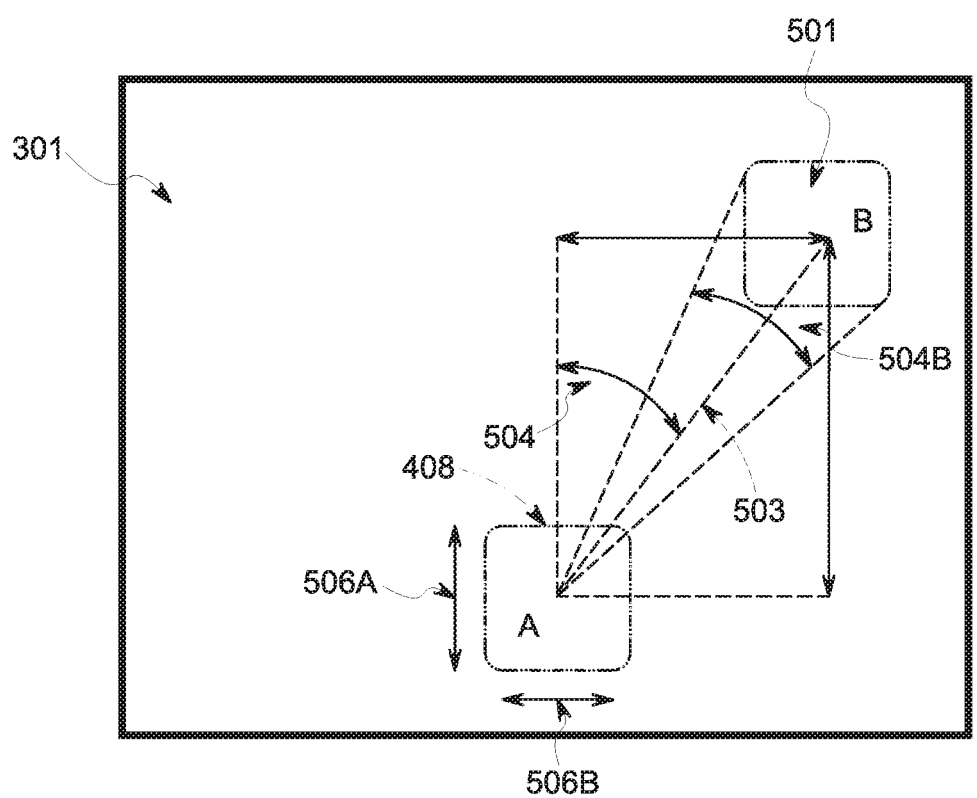
FIG. 5 graphically depicts a land area and a tap area on an HMI, in accordance with the illustrative embodiment.

FIG. 5 graphically depicts an example multiple touch input (e.g., a "Land and Tap") according to an embodiment of the present invention. As shown in FIG. 5, a first input is received at a first position shown as a land area 408 (i.e., 'A') and then a second input is received at a second position as a tap area 501 (i.e., 'B') on an HMI screen (i.e., HMI). The HMI is configured such that the 'set point' virtual control 405, which coincide with the second input 501, would activate (i.e., react to an input from an operator) only when a multiple touch input is received. To this end, only if a first finger remains touched on a land area 408 (not on the real estate of the 'Set Point' button) and a second finger gesture (e.g., tapping, sliding, etc.) is received would an operation be triggered. As a result, a single finger tap (or slide) on the 'Set Point' virtual control 405 does not invoke the corresponding operation associated with the presented widget.

As shown in FIG. 5, the land area 408 is the land used for operation (i.e., the area that would be touched in a single touch input), while the tap area 408 enables the operation of the land area 408.

In some embodiments, the widget associated with a control function is associated with a land area. To this end, the HMI would activate the widget when a first input is received at widget (e.g., button) and a second input is received at the HMI at a second location that enables the operation of the widget. In other embodiments, the widget is associated with a tap area. To this end, the HMI would activate the widget when a first input is received at a land area associated with enable in the operation of a tap area, which is associated with the widget.

In some embodiments, the HMI may present a visual indicator to the operator that the control widget is touched and activated. In some embodiments, the screen may change color, or the HMI may generate sound, or provide other visual, tactile (e.g., vibration), or acoustic notification.

Referring back to FIG. 5, in some embodiments, the HMI may present a visual indicator to the operator that the control widget is touched, but not activated, e.g., by an incorrect position of the input corresponding to the tap area. In some embodiments, the HMI may present instructions (e.g., textual description) of the tap area relative to the land area. In some embodiments, the HMI may graphically display the tap area, for example, to highlight the sequence necessary to activate the control widget. For example, if a first input at the area at 408 is received, and no second input at the area 501 is received, the HMI may display on the screen, "To activate the Control Button, please place your thumb of your right hand on the Control Button, and tab the highlighted region" where the highlighted region corresponds to area 501.

In some embodiments, the land area and tap area may have the same spatial size. In other embodiments, the tap area may have an area smaller than the land area. In another embodiment, the tap area may have an area larger than the land area. In some embodiments, the tap area may change based on a failed attempt and/or a presentation of instructions of the tap area to the operator.

In some embodiments, the land area corresponds in spatial size to a presented widget associated with a control function.

Referring still to FIG. 5, in some embodiments, the activation sequence for the multiple touch inputs may include a predefined spatial and geometric component. For example, the tap 501 area may have a predefined distance (shown as offset 503), or a range of distances, from the land area 408. In addition, the tap 501 may have a predefined angle offset (shown as angle 504), or a range of angle offsets (e.g., shown as range 504b), from the land area 408.

Referring back to FIG. 4, in some embodiments, the HMI may have a single land area 408 is common for each available touch area on the display. To this end, the land input corresponding to a control widget maybe specified for any position on the touch screen. This region may be specified, for example, at one of the four corners of the touch screen or any arbitrary area on the screen that may be specified, via a configuration panel of the HMI.

As shown in FIG. 4, in some embodiments, both the land area and the tap area are visible to the user.

In other embodiments, the area to receive the second input (i.e., the tap area) is not presented on the HMI.

In other embodiments, the HMI provides feedback to a user that the user has landed on a land area (e.g., a sound, a change in screen color, a touch area highlighted, etc.).

In some embodiments, the land area may be enabled via touch gestures besides a tap. For example, the land area may be touched to activate gesture control of virtual knobs or sliders that may require movements of the finger on the touch screen (i.e., movement other than a tap).

Figure 6:
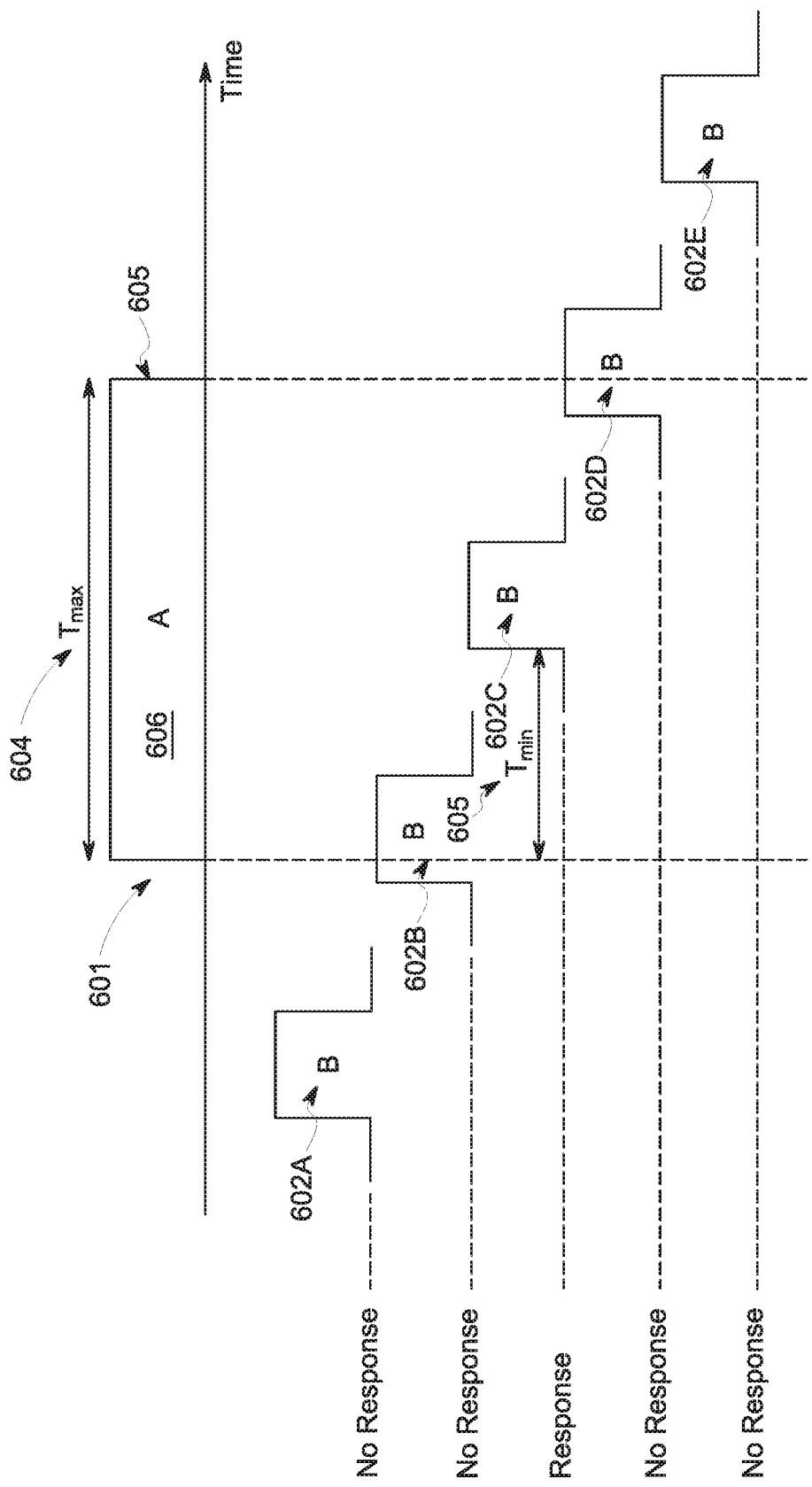
FIG. 6 graphically depicts the timing and operation of a land-and-tap gesture for controlling a human-machine interface, in accordance with the illustrative embodiment.

FIG. 6 graphically depicts the timing and operation of a land-and-tap gesture for controlling a human-machine interface according to an embodiment of the present invention.

As shown in FIG. 6, a first input 606 corresponding to an input at the land area is received at contact time 601 and is maintained until contact removal time 605. To this end an input 602a received prior to the contact time 601 associated with the land input 606 does not result in an activation of a widget associated with the control operation. In some embodiments, the land input is associated with the widget. In other embodiments, the tap input is associated with the widget.

Referring still to FIG. 6, an input received prior (shown as input 602b) to the contact time 601 does not result in an activation of the widget. That is, the land input has to be initiated prior to the tap input. In addition, an input (shown as input 602e) received following, and not concurrent with, the land input 606 does not result in an activation of the widget.

Referring still to FIG. 6, a tap input (shown as input 602d) that overlaps in part with the land input 606 does not result in an activation of the widget.

Thus, to activate the control widget, the land input 606 and the tap input (shown as input 602c) are entirely overlapping in which the land input 606 is received prior to the tap input 602c.

In some embodiments, the land input 606 may be rejected if the duration time for the input exceeds a pre-defined maximum time value. The maximum time value may be modified via a configuration panel of the HMI. In some embodiments, the maximum time value may be between 10 and 30 seconds. In some embodiments, the maximum time value may be between 5 and 10 seconds.

In some embodiments, the HMI may only cause activation of the control widget if the tap input 602c is received within a predefined time (shown as time 605) from the contact time 601 of the land input 606. In some embodiments, this activation time is between 1 and 5 seconds.

In some embodiments, the GUI receives input via a touch class, e.g., the system.windows.input class in PresentationCore.dll (for Windows). In some embodiments, the GUI receives via libinput library in Linux. In some embodiments, the GUI may operate in conjunction with a multi-touch gesture program such as Touchegg, or other multi-touch gesture programs, that runs as a user in the background, and adds multi-touch support to the window managers.

Example HMI

Figure 7:
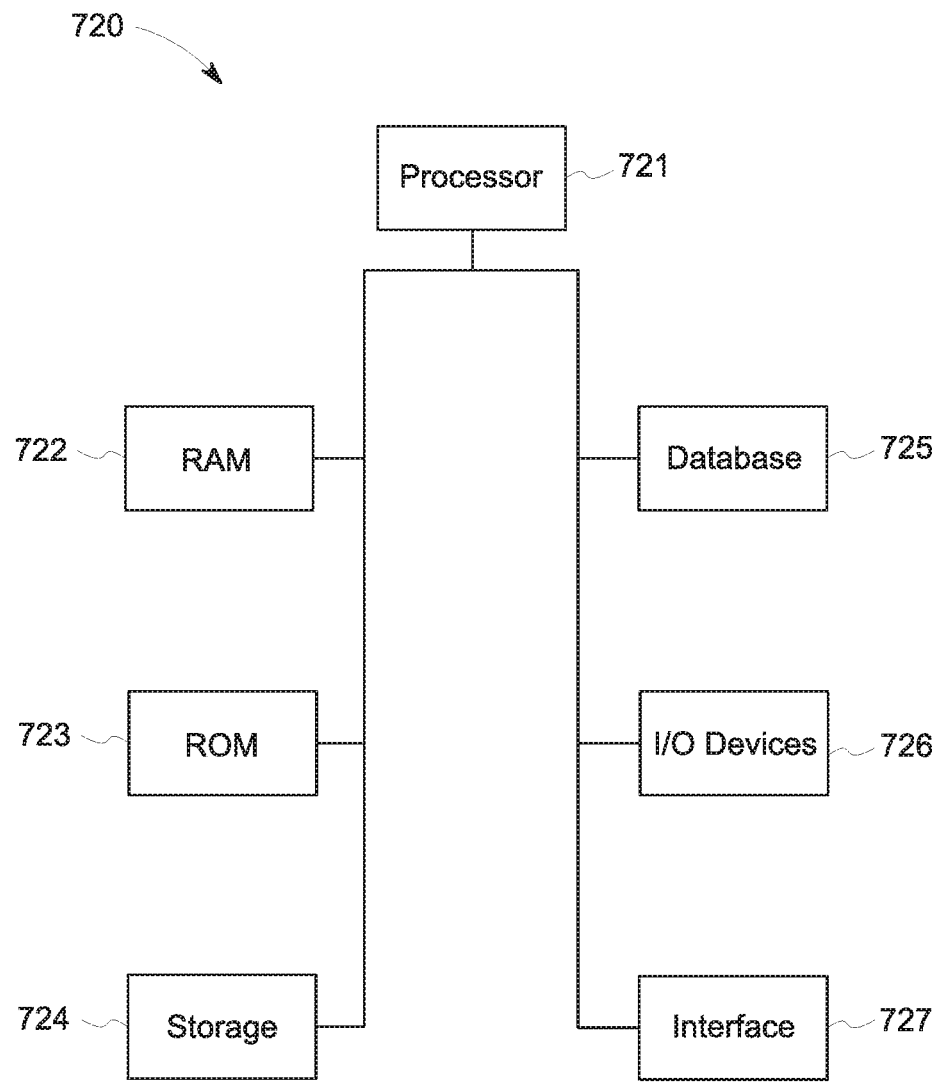
FIG. 7 illustrates an exemplary HMI controller in an industrial automation system.

FIG. 7 illustrates an exemplary HMI controller in an industrial automation system. As used herein, "HMI" and "HMI controller" may include a computer or a plurality of computers. The HMI controller may include one or more hardware components such as, for example, a processor 721, a random access memory (RAM) module 722, a read-only memory (ROM) module 723, a storage 724, a database 725, one or more input/output (I/O) devices 726, and an interface 727. Alternatively and/or additionally, HMI controller 720 may include one or more software components such as, for example, a computer-readable medium including computer executable instructions for performing a method associated with the exemplary embodiments. It is contemplated that one or more of the hardware components listed above may be implemented using software. For example, storage 724 may include a software partition associated with one or more other hardware components. It is understood that the components listed above are exemplary only and not intended to be limiting.

Processor 721 may include one or more processors, each configured to execute instructions and process data to perform one or more functions associated with a computer for indexing images. Processor 721 may be communicatively coupled to RAM 722, ROM 723, storage 724, database 725, I/O devices 726, and interface 727. Processor 721 may be configured to execute sequences of computer program instructions to perform various processes. The computer program instructions may be loaded into RAM 722 for execution by processor 721. As used herein, processor refers to a physical hardware device that executes encoded instructions for performing functions on inputs and creating outputs.

RAM 722 and ROM 723 may each include one or more devices for storing information associated with operation of processor 721. For example, ROM 723 may include a memory device configured to access and store information associated with HMI controller 720, including information for identifying, initializing, and monitoring the operation of one or more components and subsystems. RAM 722 may include a memory device for storing data associated with one or more operations of processor 721. For example, ROM 723 may load instructions into RAM 722 for execution by processor 721.

Storage 724 may include any type of mass storage device configured to store information that processor 721 may need to perform processes consistent with the disclosed embodiments. For example, storage 724 may include one or more magnetic and/or optical disk devices, such as hard drives, CD-ROMs, DVD-ROMs, or any other type of mass media device.

Database 725 may include one or more software and/or hardware components that cooperate to store, organize, sort, filter, and/or arrange data used by HMI controller 720 and/or processor 721. For example, database 725 may store hardware and/or software configuration data associated with input-output hardware devices and controllers, as described herein. It is contemplated that database 725 may store additional and/or different information than that listed above.

I/O devices 726 may include one or more components configured to communicate information with a user associated with HMI controller 720. For example, I/O devices may include a console with an integrated keyboard and mouse to allow a user to maintain a database of images, update associations, and access digital content. I/O devices 726 may also include a display including a graphical user interface (GUI) for outputting information on a monitor. I/O devices 726 may also include peripheral devices such as, for example, a printer for printing information associated with HMI controller 720, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 727 may include one or more components configured to transmit and receive data via a communication network, such as the Internet, a local area network, a workstation peer-to-peer network, a direct link network, a wireless network, or any other suitable communication platform. For example, interface 727 may include one or more modulators, demodulators, multiplexers, demultiplexers, network communication devices, wireless devices, antennas, modems, and any other type of device configured to enable data communication via a communication network.

What is claimed is:

1. A method of receiving multiple touch inputs, via a touch-screen display, at a graphical user interface of a control application executing in an industrial automation system, to trigger an associated user interface command within the control application, the method comprising:
- presenting, by a processor, via the touch-screen display, a graphical depiction of the industrial automation system, or a portion of the industrial automation system including a plurality of physical components performing an industrial process;
- presenting, by the processor, via the touch-screen display, a plurality of graphical elements, wherein each graphical element of the plurality of graphical elements is linked to execution of an associated user interface command in the control application, the user interface command operable to cause a controller in the industrial automation system to effect a change to a set-point of one or more of the physical components performing the industrial process, and wherein each of the plurality of graphical elements linked to execution of the associated user interface command is depicted adjacent to the associated one or more of the physical components;
- receiving, via the touch-screen display, a first touch input at a first position, the first touch point enabling activation of at least one of the plurality of graphical elements;
- receiving, via the touch-screen display, a second touch input at a second position, the second position associated with a selected graphical element of the at least one of the plurality of graphical elements, the second touch input received after the first touch input;
- causing the processor to activate the selected graphical element associated with the second position if the first touch input is maintained during a period in which the second touch input is received, the activation of the selected graphical element causing execution of the user interface command associated with the selected graphical element and effecting a change in the set-point of the one or more physical components performing the industrial process, and
- causing the processor to maintain in an inactivated state the selected graphical element associated with the second position if the first touch input is not maintained during the period in which the second touch input is received,
- wherein the processor is configured to reject the first touch input at the first position if the first touch input is maintained for more than a predetermined maximum time value and to ignore the second touch input at the second position if the second touch input is received after the first touch input is rejected.

2. The method of claim 1, comprising:
presenting, by the processor, via the touch-screen display, a second graphical element associated with the first position.

3. The method of claim 1, wherein the first touch input comprises a point-based input received at one or more pre-defined virtual regions located proximal to the determined graphical element linked to execution of the associated user interface command.

4. The method of claim 3, comprising:
presenting, by the processor, via the touch-screen display, an additional graphical element associated with selection of a location for the one or more pre-defined virtual regions relative to the graphical element.

5. The method of claim 1, wherein the first touch input comprises a point-based input received for a minimum time parameter.

6. The method of claim 1, wherein the first touch input comprises a point-based input received between a minimum time parameter and a maximum time parameter, wherein receipt of inputs outside the minimum and maximum time parameters are ignored as a non-activated input.

7. The method of claim 1, comprising:
presenting, by the processor, via the touch-screen display, a second graphical element for receipt of the first touch input at one of a lower or upper corner of the touch-screen display.

8. The method of claim 1, comprising:
in response to a third touch input concurrently received with the first touch input and the second associated touch input, maintaining, by the processor, the selected graphical element linked to execution of the user interface command in the non-activated state.

9. A system in an industrial automation system, the system receiving, at a graphical user interface of a control application executing in the industrial automation system, via a touch-screen display, multiple concurrently-received touch inputs to trigger an associated user interface command, the system comprising:
- the touch-screen display;
- a processor operatively coupled to the touch-screen display and to a controller in the industrial automation system, the controller controlling a plurality of physical components performing an industrial process; and
- a memory operatively coupled to the processor, the memory having instructions stored thereon, wherein execution of the instructions, cause the processor to:
- present, via the touch-screen display, a graphical depiction of the industrial automation system, or a portion of the industrial automation system including a plurality of physical components performing an industrial process;
  - presenting, by the processor, via the touch-screen display, a plurality of graphical elements, wherein each graphical element of the plurality of graphical elements linked to execution of an associated user interface command operable to cause the controller in the industrial automation system to effect a change to a set-point of one or more of the physical components performing the industrial process, and wherein each of the plurality of graphical elements linked to execution of the associated user interface command is depicted adjacent to the associated one or more of the physical components;
  - receive, via the touch-screen display, a first touch input at a first position, the first touch point enabling activation of at least one of the plurality of graphical elements;
  - receive, via the touch-screen display, a second touch input at a second position, the second position associated with a selected graphical element of the at least one of the plurality of graphical elements, the second touch input received after the first touch input;
  - cause the processor to activate the selected graphical element associated with the second position if the first touch input is maintained during a period in which the second touch input is received, the activation of the selected graphical element causing execution of the user interface command associated with the selected graphical element and effecting a change in the set-point of the one or more physical components performing the industrial process, and
  - cause the processor to maintain in an inactivated state the selected graphical element associated with the second position if the first touch input is not maintained during the period in which the second touch input is received, reject the first touch input at the first position if the first touch input is maintained for more than a predetermined maximum time value and to ignore the second touch input at the second position if the second touch input is received after the first touch input is rejected.

10. The system of claim 9, wherein the instructions, when executed by the processor, further cause the processor to:
present via the touch-screen display, a second graphical element associated with the first position.

11. The system of claim 9, wherein the first touch input comprises a point-based input received at one or more pre-defined virtual regions located proximal to the determined graphical element associated with execution of the associated user interface command.

12. The system of claim 11, wherein the instructions, when executed by the processor, further cause the processor to:
present, via the touch-screen display, an additional graphical element associated with selection of a location for the one or more pre-defined virtual regions relative to the graphical element.

13. The system of claim 9, wherein the first touch input comprises a point-based input received for a minimum time parameter.

14. The system of claim 9, wherein the first touch input comprises a point-based input received between a minimum time parameter and a maximum time parameter, wherein receipt of inputs outside the minimum and maximum time parameters are ignored as non-activated input.

15. The system of claim 9, wherein the instructions, when executed by the processor, further cause the processor to:
present, via the touch-screen display, a second graphical element for receipt of the first touch input at one of a lower or upper corner of the touch-screen display.

16. The system of claim 9, wherein the instructions, when executed by the processor, further cause the processor to:
in response to a third touch input concurrently received with the first touch input and the second associated touch input, maintain the determined graphical element linked to execution of the associated user interface command in the non-activated state.

17. A non-transitory computer readable medium to trigger, within a control application executing in an industrial automation system, an associated user interface command using multiple concurrently-received touch inputs received at a graphical user interface of a touch-screen display the computer readable medium having instructions stored thereon, wherein when executed by a processor, cause the processor to:
present, via the touch-screen display associated with a computing device, a graphical depiction of the industrial automation system, or a portion of the industrial automation system including a plurality of physical components performing an industrial process;
presenting, by the computing device, via the touch-screen display, a plurality of graphical elements, wherein each graphical element is linked to execution of an associated user interface command operable to cause a controller in the industrial automation system to effect a change to a set-point of one or more of the physical components performing the industrial process, and wherein each of the plurality of graphical elements linked to execution of the associated user interface command is depicted adjacent to the associated one or more of the physical components;
receive, via the touch-screen display, a first touch input at a first position, the first touch point enabling activation of at least one of the plurality of graphical elements;
receive, via the touch-screen display, a second touch input at a second position, the second position associated with a selected graphical element of the at least one of the plurality of graphical elements, the second touch input received after the first touch input;
cause the processor to activate the selected graphical element associated with the second position if the first touch input is maintained during a period in which the second touch input is received, the activation of the selected graphical element causing execution of the user interface command associated with the selected graphical element and effecting a change in the set-point of the one or more physical components performing the industrial process, and
cause the processor to maintain in an inactivated state the selected graphical element associated with the second position if the first touch input is not maintained during the period in which the second touch input is received,
cause the processor to reject the first touch input at the first position if the first touch input is maintained for more than a predetermined maximum time value and to ignore the second touch input at the second position if the second touch input is received after the first touch input is rejected.

* * * * *